(12) United States Patent
Liu et al.

(10) Patent No.: US 12,312,656 B1
(45) Date of Patent: May 27, 2025

(54) METHOD FOR PRODUCTION OF GRAPHENE COMPOSITE COMPONENTS HAVING ENHANCED THERMAL CONDUCTIVITY

(71) Applicant: GM Global Technology Operations LLC, Detroit, MI (US)

(72) Inventors: Yi Liu, Troy, MI (US); Qigui Wang, Rochester Hills, MI (US); Devin R. Hess, Clarkston, MI (US); Ronald C. Daul, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/443,635

(22) Filed: Feb. 16, 2024

(51) Int. Cl.
| | |
|---|---|
| *B22D 27/02* | (2006.01) |
| *B22D 1/00* | (2006.01) |
| *B22D 21/02* | (2006.01) |
| *B22D 27/08* | (2006.01) |
| *C22C 1/10* | (2023.01) |
| *H01M 10/6554* | (2014.01) |

(52) U.S. Cl.
CPC ............. *C22C 1/1036* (2013.01); *B22D 1/00* (2013.01); *B22D 21/02* (2013.01); *B22D 27/02* (2013.01); *B22D 27/08* (2013.01); *H01M 10/6554* (2015.04); *H01M 2220/20* (2013.01)

(58) Field of Classification Search
CPC ......... B22D 1/00; B22D 21/02; B22D 27/02; B22D 27/08; C22C 1/10; C22C 1/1036

USPC ....................... 164/499, 71.1, 260
See application file for complete search history.

(56) References Cited

U.S. PATENT DOCUMENTS

2021/0062304 A1   3/2021   Ren et al.

FOREIGN PATENT DOCUMENTS

| CN | 108060321 A | 5/2018 | |
|---|---|---|---|
| CN | 108165788 A * | 6/2018 | ............ B22D 27/02 |
| CN | 109402442 A | 3/2019 | |
| CN | 115007830 A | 9/2022 | |
| CN | 116356193 A | 6/2023 | |

OTHER PUBLICATIONS

Machine translation of CN 108165788 A (Year: 2018).*

* cited by examiner

*Primary Examiner* — Kevin P Kerns
(74) *Attorney, Agent, or Firm* — Vivacqua Crane, PLLC

(57) ABSTRACT

A method for mass-producing graphene composite vehicle components is provided. The method includes injecting a first flux into molten metal contained in a furnace using a first flux injection system and injecting a graphene flux into the molten metal using a second flux injection system. The method includes agitating and homogenizing the molten metal and the graphene flux within the furnace using an agitator. The method includes transferring the molten metal into a mold having an electromagnetic stirring system and then stirring the molten metal with the electromagnetic stirring system until the molten metal solidifies. The electromagnetic stirring system maintains homogenization of the molten metal and the graphene flux.

19 Claims, 3 Drawing Sheets

METHOD FOR PRODUCTION OF GRAPHENE COMPOSITE COMPONENTS HAVING ENHANCED THERMAL CONDUCTIVITY

INTRODUCTION

The present disclosure relates to the field of graphene composites and, more particularly, to casting methods for forming a mass-produced graphene composite with an evenly distributed graphene matrix in the composite.

Aluminum and aluminum alloy materials are used as thermal conductors in many components, such as in electric vehicle battery pack components. Batteries and other vehicle components create heat within vehicle battery packs, which must be removed to prevent overheating. Additionally, the battery pack components are subject to stresses and must be structurally sound. The battery pack components, when including 1xxx pure aluminum and aluminum alloys, are subject to grain growth at increased operating temperatures (50° C.-100° C.) when subjected to long term operation. Further, copper and copper alloy materials are used as electrical conductors in many components.

While current aluminum and aluminum alloy and copper and copper alloy components achieve their intended purpose of being thermally and electrically conductive and providing structural strength and stability, there is a need for components and methods and systems for making the components that have increased thermal and electrical conductivity, structural strength, and material thermal stability.

SUMMARY

In accordance with another aspect of the disclosure, the method includes injecting at least one of nitrogen gas or argon when degassing and injecting the first flux.

In accordance with another aspect of the disclosure, the method includes injecting graphene having a surface treatment of nickel deposited on the graphene when injecting the graphene flux into the molten metal.

In accordance with another aspect of the disclosure, the method includes injecting graphene premixed with at least one of graphene aluminum powder or graphene copper powder when injecting the graphene flux into the molten metal.

In accordance with another aspect of the disclosure, the method includes using a propeller agitator when agitating and homogenizing the molten metal.

According to several aspects of the present disclosure, a method for cooling components used in electric vehicles is provided. The method includes injecting a first flux into molten metal in a furnace using a first flux injector. The first flux includes at least one of nitrogen gas or argon, and the molten metal is degassed by the first flux. The method includes injecting a graphene flux into the molten metal using a second flux injector. The graphene flux is a powder, and wherein the graphene flux includes a surface treatment including at least one of nickel or copper. The method includes agitating and homogenizing the molten metal and the graphene flux in a furnace using a propeller agitator. The method also includes transferring the molten metal into a mold having an electromagnetic stirring system. The electromagnetic stirring system maintains homogenization of the molten metal and the graphene flux. The method also includes stirring the molten metal with the electromagnetic stirring system until the molten metal solidifies at a temperature equal to or less than 660° C. and forming a cooling component for an electric vehicle from the cooled molten metal. The cooling component includes a vehicle battery pack cooling plate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
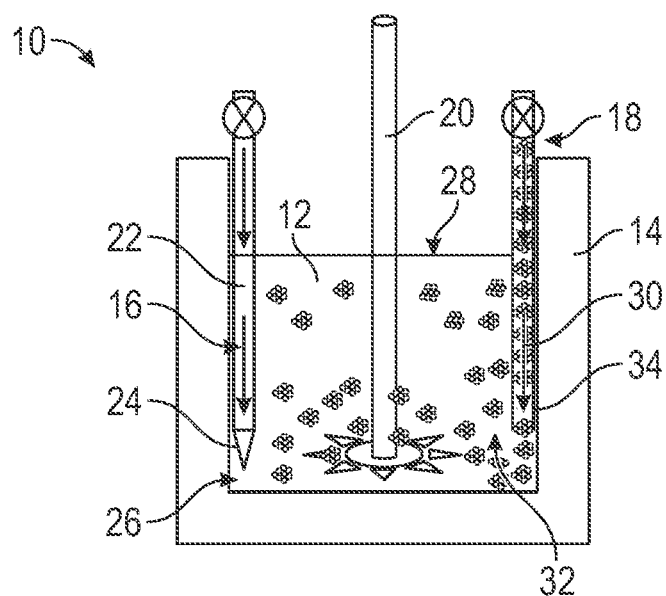
FIG. 1 is a simplified diagrammatic view illustrating a furnace system for containing and homogenizing graphene-containing molten metal, in accordance with the present disclosure.

Referring to FIG. 1, a diagrammatic view of a simplified furnace system 10 for containing and homogenizing graphene-containing molten metal 12 is shown, according to the principles of the present disclosure. The furnace system 10 provides homogeneity within a matrix of the molten metal 12 as graphene or other materials are added. The furnace system 10 includes a furnace 14, first flux injection system 16, second flux injection system 18, and an agitator 20.

As shown in FIG. 1, the furnace system 10 includes at least one furnace 14. The furnace 14 is configured to provide heat to metal resulting in molten metal 12. The molten metal 12 may include a metal or an alloy, for example, appropriate for use in a vehicle (e.g., a vehicle battery pack cooling plate, a vehicle frame, and the like). Some examples of a molten metal or an alloy may include aluminum and/or copper. In some instances, a cooling temperature of the molten metal may be 600° C. or less. The furnace 14 can include, for example, an induction furnace, an electric arc furnace, a crucible furnace, and the like.

Referring to FIG. 1, a first flux injection system 16 is arranged to provide a first flux 22 to an inner portion of the furnace 14 and into the molten metal 12. The first flux injection system 16 may include a degassing unit having a flux injector 24, for example a graphite tube or a rotating shaft, configured for injecting the first flux 22 into the molten metal 12. When the molten metal 12 includes aluminum, hydrogen gas can build up within the molten aluminum and result in undesirable holes in a final casting. To remove the hydrogen gas, the flux injector 24 injects the first flux 22 including an inert gas, for example argon or nitrogen, into the molten metal 12. The inert gas attaches to the hydrogen and brings the hydrogen gas to the surface for release into the atmosphere. Moreover, molten aluminum oxidizes quickly. To remove the resulting oxides, the first flux 22 is injected into the molten metal 12 and to a bottom 26 of the furnace 14. The flux attaches to the oxides and is brought to a surface 28 of the molten metal 12 by rising bubbles and subsequently removed.

Referring still to FIG. 1, a second flux injection system 18 is arranged to provide a graphene flux 30 to an inner portion 32 of the furnace 14 and into the molten metal 12. The second flux injection system 18 includes a second injector 34, for example a graphite tube or a rotating shaft. The second flux injection system 18 injects the graphene flux onto the surface 28 and/or within the molten metal 12.

The graphene flux 30 includes at least graphene and may include other materials. The graphene may be in a variety of forms, for example graphene flakes, graphene particles, and/or graphene powder. When in the form of graphene flakes, the graphene flakes can be single-layer graphene flakes and/or several-layer graphene flakes. In some instances, the graphene flakes are formed via an electrochemical exfoliation technique. In one example, the average lateral diameter of graphene flakes is between 10 nanometers (nm) and 10 micrometers (μm). The graphene flakes are sized to provide desired mechanical, electrical conductivity, and/or thermal conductivity properties of resulting graphene-aluminum composite parts.

In some instances, the graphene flux 30 includes graphene mixed with aluminum (Al) particles, for example an aluminum powder (e.g., graphene aluminum powder) and/or copper (Cu) particles (e.g., graphene copper powder). The aluminum and/or copper powder and graphene can be formed with opposing charges that enhance both contact between the aluminum and/or copper particles and graphene flakes and packing of the resultant graphene aluminum composite powder and/or the graphene copper composite powder. Additionally, the aluminum and/or copper can function as a carrier for the graphene.

In some instances, the graphene flux 30 includes graphene that has been plasma treated and, for example, more negatively charged. Plasma treating the graphene includes modifying original surface characteristics of the graphene by using energetic and reactive radicals in the plasma to interact with the graphene surface. The plasma treatment can have several effects in the graphene including breaking C—C bonds, removing surface atoms, and/or cleaning the graphene surface.

In some instances, the graphene flux 30 includes graphene with a surface treatment. Using a graphene with a surface treatment improves wettability. For example, the graphene surface can include a coating of copper or nickel. When surface treated, coating material (e.g., the copper and/or nickel) can be deposited or applied using processes including electrodeposition, chemical vapor deposition, and/or a solution containing the coating material (e.g., nickel sulfate hexahydrate solution) applied to the graphene.

Referring to FIG. 1, an agitator 20 is arranged to extend into the molten metal 12 in the furnace 14. As the first flux 22 and/or the graphene flux 30 is provided to the molten metal 12, the agitator 20 spins and mixes the molten metal 12. The mixing molten metal 12 facilitates homogenization of the graphene flux 30 and the resulting mixture is transferred to a mold. In one aspect, the agitator 20 is a propeller agitator configured to create an axial flow within the molten metal 12. It should be appreciated that the agitator may include other types of agitators or impellers, for example a parabolic agitator, a helical agitator, a blade-type agitator, and the like.

Figure 2:
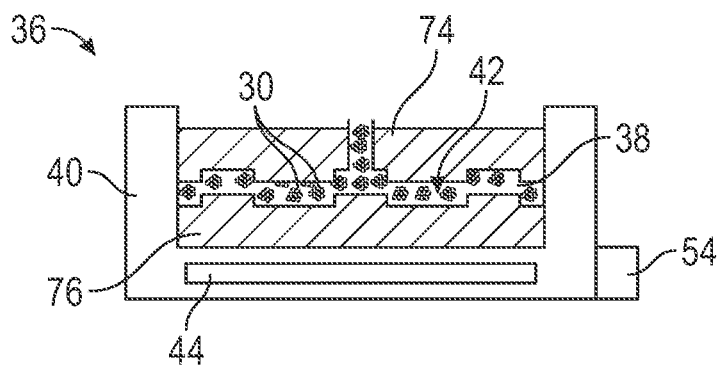
FIG. 2 is a simplified diagrammatic view illustrating a high pressure die cast (HPDC) configured to receive molten metal from the furnace system shown in FIG. 1, in accordance with the present disclosure.

Referring now to FIG. 2, a diagrammatic view of a simplified high pressure die cast (HPDC) mold 36 is shown. The HPDC mold 36 receives the homogenized molten metal and graphene flux mixture 38 from the furnace system 10. The HPDC mold 36 includes a metal die 40 having a cavity 42 in a negative shape of the part to be formed and an electromagnetic stirring system 44. The mixture 38 fills the cavity 42, the HPDC mold 36 is sealed, and the mixture 38 is exposed to high pressure (e.g., greater than 1000 bar) until the mixture 38 solidifies.

The electromagnetic stirring system 44 is disposed within the HPDC mold 36 and uses a magnetic field to create a rotational Lorentz force and fluid flow in the mixture 38. The magnetic field acts as a non-intrusive stirring device within the mixture 38 to maintain homogenization of the graphene flux 30 until solidification of the mixture 38. It should be appreciated that the electromagnetic stirring system 44 may include, for example, an electromagnetic stirrer (EMS) as well as other systems, such as an electromagnetic braking system (EMBR). In some instances, the electromagnetic stirring system 44 can be coupled to the HPDC mold 36 instead of being disposed within the HPDC mold 36.

Figures 3A, 3B:
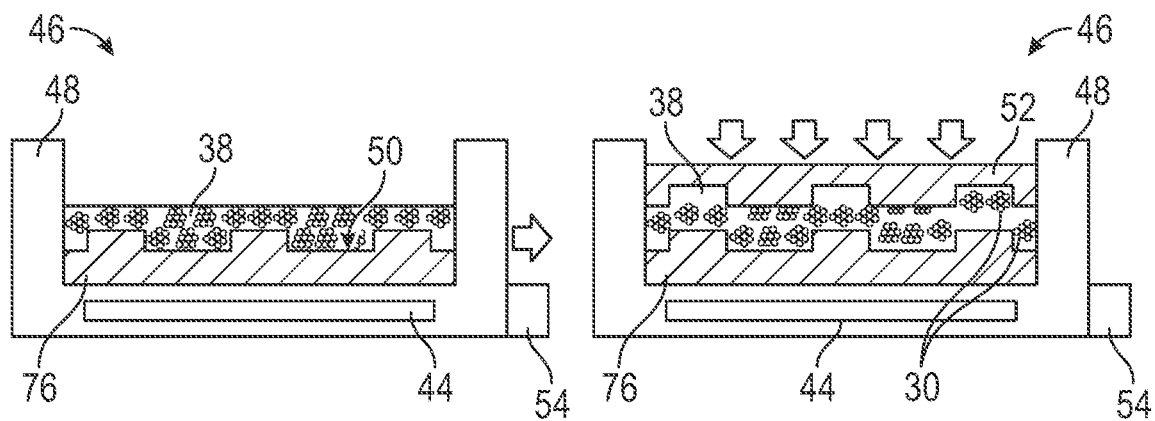
FIG. 3A is a simplified diagrammatic view illustrating an open mold configured to receive molten metal from the furnace system shown in FIG. 1, in accordance with the present disclosure.
FIG. 3B is a simplified diagrammatic view illustrating the open mold configured to receive molten metal from the furnace system shown in FIG. 1, with a forming press in place, in accordance with the present disclosure.

FIG. 3A illustrates a diagrammatic view of a simplified open mold 46 having the electromagnetic stirring system 44. The open mold 46 can be used in addition to or alternatively to the HPDC mold 36. The open mold 46 receives the homogenized molten metal and graphene flux mixture 38 from the furnace system 10. The open mold 46 includes an open die 48 with a portion 50 of the open die 48 in the negative shape of a portion of the part to be formed. The mixture 38 fills the portion 50.

Referring to FIG. 3B, after the open die 48 is filled with the mixture 38, a forming press 52, having at least a portion of the negative shape of the part to be formed, is applied and pressed into the mixture 38 to form the part and seal the open mold 46 until the mixture 38 solidifies. The electromagnetic stirring system 44 is disposed within the open mold 46 and maintains homogenization of the graphene flux 30 within the mixture 38. In some instances, the electromagnetic stirring system 44 can be coupled to the open die 48 instead of being disposed within the open die 48.

As shown in FIGS. 2 through 3B, the HPDC mold 36 or the open mold 46 may include a vibration system 54. The vibration system 54 facilitates homogenization of the graphene flux 30 within the mixture 38 while providing reduced shrinkage, better morphology, better surface finish, and reduction in hot tear. Additionally, the vibration system 54 can facilitate significant grain refinement and compression strength and hardness of the cast part. In some aspects, the vibration system 54 provides frequencies from 0 to 20 hertz (Hz) during the casting process. The vibration system 54 can be disposed as a portion of the HPDC mold 36 or open mold 46 or can be coupled to and in communication with the HPDC mold 36 or open mold 46.

Figure 4:
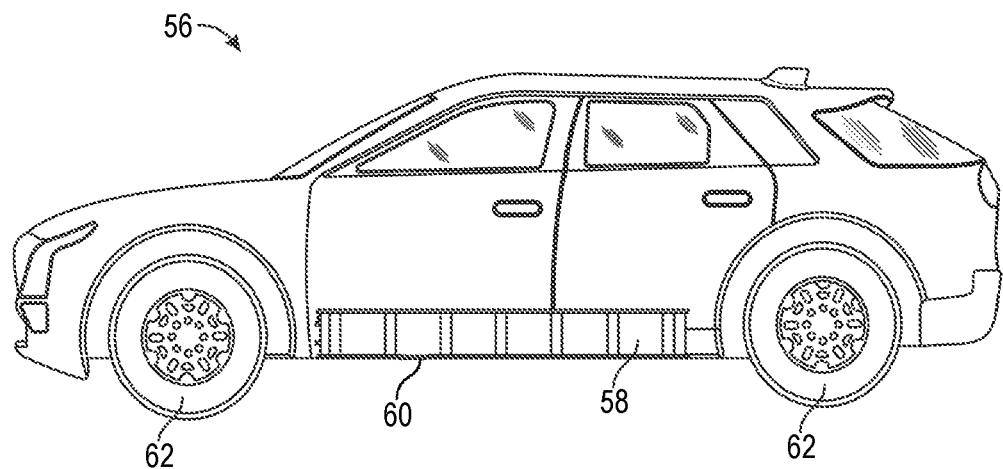
FIG. 4 is a side perspective view illustrating a vehicle having a battery pack assembly with a cooling plate formed using the furnace system shown in FIG. 1 and the molds shown in FIGS. 2 through 3B, in accordance with the present disclosure.

FIG. 4 illustrates a vehicle 56 having a vehicle battery pack assembly 58 with a vehicle battery pack cooling plate 60 formed using the furnace system 10 and the HPDC mold 36 and/or the open mold 46. The battery pack assembly 58 provides motive power to the vehicle 56. The battery pack assembly 58 is illustrated with an exemplary vehicle 56, and the vehicle 56 is an electric vehicle or hybrid vehicle having wheels 62 driven by an electric vehicle motor (not shown).

Figure 5:
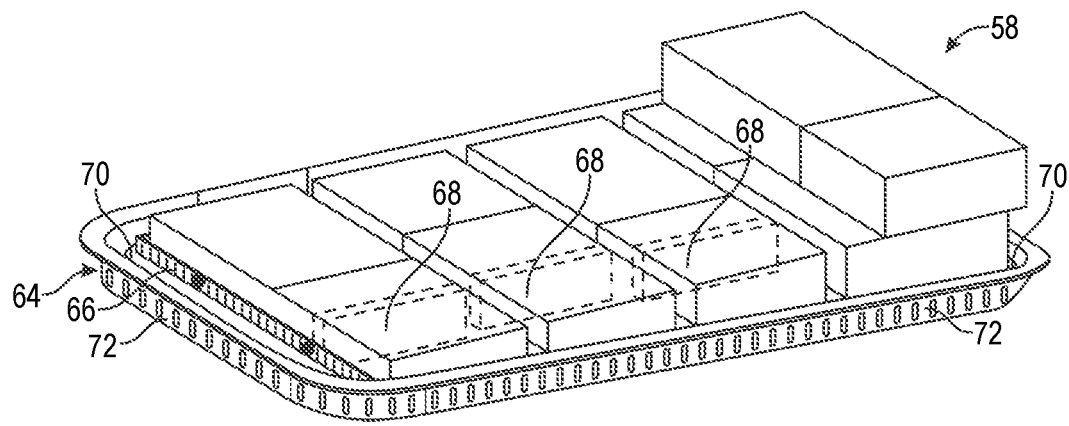
FIG. 5 is a perspective view illustrating the battery pack assembly shown in FIG. 4 with the cooling plate formed using the furnace system depicted in FIG. 1, in accordance with the present disclosure.

Referring now to FIG. 5, a perspective view of the battery pack assembly 58 is shown and generally includes a battery pack enclosure 64, a cooling plate 66, and a plurality of battery cells 68. The battery pack enclosure 64 generally includes a floor 70 and a plurality of side walls 72. The plurality of side walls 72 extend around a periphery of the floor 70. The floor 70 is a generally planar member and is supported by and mounted to the vehicle 56 using mechanical fasteners (not shown) such as bolts or the like threaded through apertures in the floor 70. Additionally, the battery pack enclosure 64 may include a top cover (not shown) coupled to the plurality of side walls 72. The cooling plate 66 is supported by the floor 70 of the battery pack enclosure 64. The cooling plate 66 regulates temperature of the battery pack enclosure 64 by removing heat dissipated from batteries or other heat-producing devices and transferred to the cooling plate 66. The cooling plate 66 is an example of a graphene-based cast component using the HPDC mold 36 or the open mold 46 having the electromagnetic stirring system 44 disclosed herein.

Figure 6:
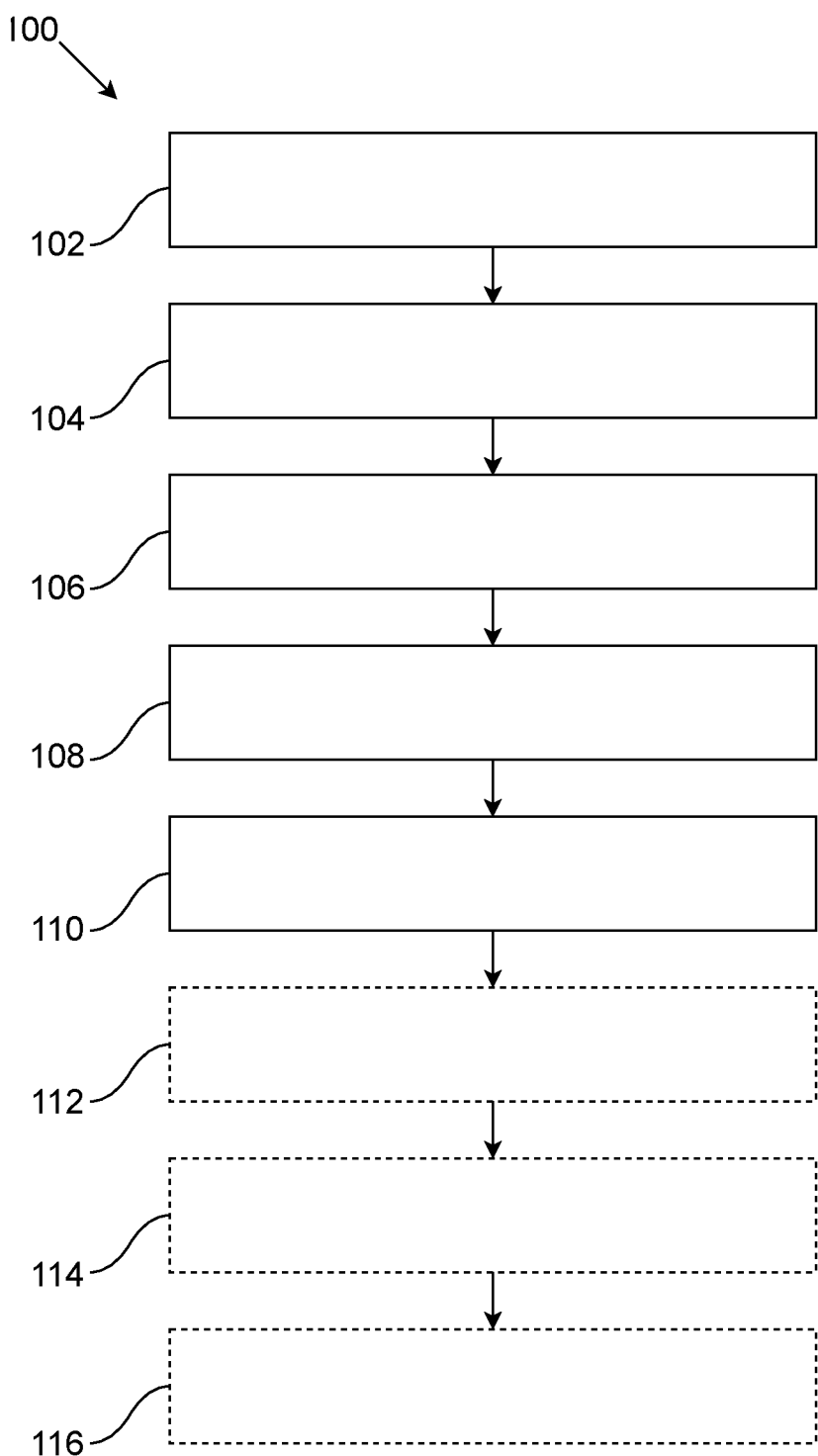
FIG. 6 is a flowchart illustrating a method of mass-producing graphene composite vehicle components using the furnace system shown in FIG. 1 and the molds shown in FIGS. 2 through 3B, in accordance with the present disclosure.

FIG. 6 illustrates a method 100 of mass-producing graphene composite vehicle components, for example the cooling plate 60 shown in FIGS. 4 and 5. The method 100 starts at block 102.

At block 102, the first flux 22 is injected into molten metal 12 in the furnace 14 using the first flux injection system 16. Injecting the first flux 22 includes using a flux injector 24 to provide a gas (e.g., argon, nitrogen gas) or other material under a surface of the molten metal 12. Injecting the first flux 22 may include degassing the molten metal 12, for example degassing hydrogen gas. Moreover, injecting the first flux 22 may include removing oxides resulting from oxidization of the molten metal 12, for example molten aluminum.

At block 104, the graphene flux 30 is injected into the molten metal using a second flux injection system 18. Injecting the graphene flux 30 includes using a second injector 34 to provide graphene under and/or on the surface 28 of the molten metal 12. Injecting the graphene flux 30 can include providing graphene in the form of powder and/or flakes such that the graphene can be mixed into the molten metal 12.

At block 106, the molten metal 12 and the graphene flux 30 in the furnace 14 is agitated and homogenized using the agitator 20. Agitating the graphene flux 30 and the molten metal 12 includes using the agitator 20 to homogenize and thoroughly mix the graphene flux 30 within the mixture 38. Without using the agitator 20 to agitate and homogenize the graphene flux 30 and molten metal mixture 38 may lead to an incomplete mixing of or separation of the graphene from the molten metal 12, which is undesirable.

Then at block 108, the molten metal 12 is transferred into a mold (e.g., HPDC mold 36, open mold 46) having an electromagnetic stirring system 44. Transferring the molten metal 12 includes pouring or otherwise causing the molten metal mixture 38 to flow to the mold. In some instances, transferring the molten metal 12 can include using a high-pressure system, such as a hydraulic or pneumatic-powered piston or plunger device, to force the molten metal mixture 38 into the HPDC mold. In other instances, transferring the molten metal 12 can include using a pour process and gravity to flow into the open mold 46.

At block 110, the molten metal mixture 38 is stirred using the electromagnetic stirring system 44 until the mixture 38 solidifies. The electromagnetic stirring system 44 maintains and facilitates homogenization of the molten metal 12 and the graphene flux 30. Without stirring the molten metal mixture 38, the graphene added as the graphene flux 30 may clump, separate, and/or become unevenly distributed within the mixture 38, thus reducing the graphene benefits. In an example, the molten metal mixture 38 is stirred with an electromagnetic stirring system 44 with a frequency between 5 and 20 hertz (Hz) and an alternating current (AC) between 50 and 300 amps (A). The stirring is continuously applied to the molten metal mixture 38 until solidification completes.

At block 112, method 100 can include vibrating the molten metal 12 in the mold using ultrasonic vibration. The ultrasonic vibration may be provided using a vibration system 54 to maintain even distribution and homogenization of the graphene flux 30 in the molten metal during cooling in the mold (e.g., HPDC mold 36, open mold 46).

At block 114, the solidified mixture 38 can be formed into a cooling component for an electric vehicle (e.g., vehicle 56). The cooling component may include a vehicle battery pack cooling plate (e.g., cooling plate 60). In an example, the HPDC mold 36 is configured in the negative shape of the cooling component, and upon cooling of the molten metal mixture 38, the cooling component is formed. In another example, the open mold 46 and the forming press 52 are configured in the negative shape of the cooling component, and upon cooling and/or solidification of the molten metal mixture 38, the forming press 52 is used to press upon the cooled mixture 38 therein forming the cooling component.

At block 116, method 100 may include releasing cast metal from the mold after cooling and solidification, wherein the graphene flux is evenly distributed in the cooled metal. The HPDC mold 36 and/or the open mold 46 may include a cover side 74 (i.e. forming press 52 in the case of the open mold 46) and an ejector half 76 (Shown in FIGS. 2 through 3B). The solidified mixture 38 remains in the ejector half 76 as the HPDC mold 36 or the open mold 46 are opened. The ejector half 76 includes ejector pins driven by an ejector pin plate (not shown). The ejector pins are used to release the cast metal from the HPDC mold 36 and/or the open mold 46. The method 100 then ends.

The present disclosure has many advantages and benefits over prior art systems and methods for producing a graphene-based composite components. For example, using the furnace system 10 with an agitator 20 provides better dispersion of the graphene within the molten metal 12. Additionally, transferring the molten metal 12 from the furnace system 10 to the HPDC mold 36 or the open mold 46 having an electromagnetic stirring system 44 provides better dispersed graphene within the molten metal 12 until the molten metal 12 solidifies. This better dispersion of graphene throughout the solidified cast component provides a component with improved thermal and electrical conductivity.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for mass-producing graphene composite vehicle components, comprising:
   injecting a first flux into molten metal contained in a furnace using a first flux injection system;
   injecting a graphene flux into the molten metal using a second flux injection system;
   agitating and homogenizing the molten metal and the graphene flux within the furnace using an agitator;
   transferring the molten metal into a mold having an electromagnetic stirring system; and
   stirring the molten metal with the electromagnetic stirring system until the molten metal solidifies, wherein the electromagnetic stirring system maintains homogenization of the molten metal and the graphene flux.

2. The method of claim 1, wherein degassing and injecting the first flux into molten metal includes injecting the first flux into at least one of molten copper or molten aluminum.

3. The method of claim 1, wherein degassing and injecting the first flux includes injecting at least one of nitrogen gas or argon.

4. The method of claim 1, wherein injecting the graphene flux into the molten metal includes injecting graphene having a surface treatment.

5. The method of claim 4, wherein the surface treatment includes at least one of nickel or copper deposited on the graphene flux.

6. The method of claim 1, wherein injecting the graphene flux into the molten metal includes injecting graphene premixed with at least one of graphene aluminum powder or graphene copper powder.

7. The method of claim 1, wherein agitating and homogenizing the molten metal and the graphene flux includes using a propeller agitator.

8. The method of claim 1, wherein transferring the molten metal into the mold having the electromagnetic stirring system includes injecting the molten metal into a high pressure die cast mold.

9. The method of claim 1, wherein transferring the molten metal into the mold having the electromagnetic stirring system includes pouring the molten metal into an open die.

10. The method of claim 1, wherein the molten metal has a cooling temperature of 600° C. or less for aluminum and 1000° C. or less for copper.

11. The method of claim 1, further comprising:
   vibrating the molten metal in the mold using ultrasonic vibration to maintain even distribution of the graphene flux in the molten metal during cooling.

12. The method of claim 1, further comprising:
   releasing cast metal from the mold after cooling, wherein the graphene flux is evenly distributed in the cooled molten metal.

13. A method for mass producing aluminum components used in electric vehicles, comprising:
   injecting a first flux into molten metal in a furnace using a first flux injector, wherein the first flux includes at least one of nitrogen gas or argon, and wherein the molten metal is degassed by the first flux;
   injecting a graphene flux into the molten metal using a second flux injector, wherein the graphene flux is a powder, and wherein the graphene flux includes a surface treatment including at least one of nickel or copper;
   agitating and homogenizing the molten metal and the graphene flux in a furnace using a propeller agitator;
   transferring the molten metal into a mold having an electromagnetic stirring system, wherein the electromagnetic stirring system maintains homogenization of the molten metal and the graphene flux; and
   stirring the molten metal with the electromagnetic stirring system until the molten metal solidifies at a temperature equal to or less than 660° C.

14. The method of claim 13, wherein degassing and injecting the first flux into molten metal includes injecting the first flux into at least one of molten copper or molten aluminum.

15. The method of claim 13, wherein degassing and injecting the first flux includes injecting at least one of nitrogen gas or argon.

16. The method of claim 13, wherein injecting the graphene flux into the molten metal includes injecting graphene having a surface treatment of nickel deposited on the graphene.

17. The method of claim 13, wherein injecting the graphene flux into the molten metal includes injecting graphene premixed with at least one of graphene aluminum powder or graphene copper powder.

18. The method of claim 13, wherein agitating and homogenizing the molten metal and the graphene flux includes using a propeller agitator.

19. A method for mass producing cooling components used in electric vehicles, comprising:
   injecting a first flux into molten metal in a furnace using a first flux injector, wherein the first flux includes at least one of nitrogen gas or argon, and wherein the molten metal is degassed by the first flux;
   injecting a graphene flux into the molten metal using a second flux injector, wherein the graphene flux is a powder, and wherein the graphene flux includes a surface treatment including at least one of nickel or copper;
   agitating and homogenizing the molten metal and the graphene flux in a furnace using a propeller agitator;
   transferring the molten metal into a mold having an electromagnetic stirring system, wherein the electromagnetic stirring system maintains homogenization of the molten metal and the graphene flux;
   stirring the molten metal with the electromagnetic stirring system until the molten metal solidifies at a temperature equal to or less than 660° C.; and
   forming a cooling component for an electric vehicle from the cooled molten metal, wherein the cooling component includes a vehicle battery pack cooling plate.

* * * * *